(12) United States Patent
Rahman et al.

(10) Patent No.: US 11,240,702 B2
(45) Date of Patent: *Feb. 1, 2022

(54) SYSTEM AND METHOD FOR QUALITY OF SERVICE IN A WIRELESS NETWORK ENVIRONMENT

(71) Applicant: AT&T Intellectual Property I, L.P., Atlanta, GA (US)

(72) Inventors: Moshiur Rahman, Marlboro, NJ (US); Paritosh Bajpay, Edison, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 66 days.

This patent is subject to a terminal disclaimer.

(21) Appl. No.: 16/779,694

(22) Filed: Feb. 3, 2020

(65) Prior Publication Data

US 2020/0178114 A1 Jun. 4, 2020

Related U.S. Application Data

(63) Continuation of application No. 15/471,659, filed on Mar. 28, 2017, now Pat. No. 10,555,207, which is a
(Continued)

(51) Int. Cl.
*H04W 28/02* (2009.01)
*H04W 40/12* (2009.01)
(Continued)

(52) U.S. Cl.
CPC ......... *H04W 28/0268* (2013.01); *H04L 45/22* (2013.01); *H04W 40/00* (2013.01);
(Continued)

(58) Field of Classification Search
CPC ..... H04W 40/00; H04W 40/12; H04W 40/18; H04W 40/20; H04W 40/02; H04W 28/02;
(Continued)

(56) References Cited

U.S. PATENT DOCUMENTS 5,933,425 A 8/1999 Iwata
6,272,139 B1 8/2001 Soncodi
(Continued)

OTHER PUBLICATIONS

Non-Final Office Action received for U.S. Appl. No. 13/555,915 dated Nov. 15, 2013, 14 pages.
(Continued)

*Primary Examiner* — Jung H Park
(74) *Attorney, Agent, or Firm* — Amin, Turocy & Watson, LLP

(57) ABSTRACT

Disclosed herein are systems, methods, and non-transitory computer-readable storage media for providing on-demand quality of service guarantees in a wireless network environment. The system determines an on-demand quality of service for a segment of a communication path between a user equipment communicating with a radio access network connected to a core network and an external network connected to the core network. The system then determines if the on-demand quality of service for the segment meets a quality of service requirement. If the on-demand quality of service for the segment does not meet the quality of service requirement, the system identifies an alternate communication path between the user equipment and the external network, wherein the alternate communication path differs from the communication path. The system can then setup the alternate communication path for traffic between the user equipment and the external network.

20 Claims, 5 Drawing Sheets

Related U.S. Application Data continuation of application No. 14/457,187, filed on Aug. 12, 2014, now Pat. No. 9,615,288, which is a continuation of application No. 13/555,915, filed on Jul. 23, 2012, now Pat. No. 8,805,382.

(51) Int. Cl.
*H04L 12/707* (2013.01)
*H04W 40/00* (2009.01)
*H04W 40/02* (2009.01)
*H04W 40/18* (2009.01)
*H04W 40/20* (2009.01)
*H04W 84/12* (2009.01)

(52) U.S. Cl.
CPC ............ *H04W 40/12* (2013.01); *H04W 40/02* (2013.01); *H04W 40/18* (2013.01); *H04W 40/20* (2013.01); *H04W 84/12* (2013.01); *Y02D 30/70* (2020.08)

(58) Field of Classification Search
CPC .. H04W 28/0268; H04W 84/12; H04L 45/22; Y02D 30/70
See application file for complete search history.

(56) References Cited

U.S. PATENT DOCUMENTS

| | | |
|---|---|---|
| 6,377,551 B1 | 4/2002 | Luo |
| 6,385,201 B1 | 5/2002 | Iwata |
| 6,944,675 B2 | 9/2005 | Fujita |
| 7,047,316 B2 | 5/2006 | Iwata |
| 8,805,382 B2 | 8/2014 | Rahman |
| 2002/0049855 A1 | 4/2002 | Porotsky |
| 2002/0059170 A1 | 5/2002 | Vange |
| 2004/0008687 A1 | 1/2004 | Matsubara |
| 2004/0008688 A1 | 1/2004 | Matsubara et al. |
| 2004/0148297 A1 | 7/2004 | Park |
| 2004/0190500 A1 | 9/2004 | Wratten |
| 2006/0221933 A1 | 10/2006 | Bauer |
| 2007/0086384 A1 | 4/2007 | Katsu |
| 2008/0304416 A1 | 12/2008 | Fodor |
| 2011/0314145 A1* | 12/2011 | Raleigh ............... H04L 41/0893 709/224 |
| 2012/0082073 A1* | 4/2012 | Andreasen .......... H04L 12/4633 370/310 |
| 2012/0198081 A1 | 8/2012 | Zhao |
| 2012/0207040 A1 | 8/2012 | Comsa et al. |
| 2014/0024383 A1 | 1/2014 | Rahman |
| 2015/0103772 A1* | 4/2015 | Carnero Ros ........... H04L 45/04 370/329 |

OTHER PUBLICATIONS

Notice of Allowance received for U.S. Appl. No. 13/555,915 dated Apr. 4, 2014, 16 pages.
Non-Final Office Action received for U.S. Appl. No. 14/457,187 dated Jun. 30, 2016, 55 pages.
Non-Final Office Action received for U.S. Appl. No. 15/471,659 dated Oct. 2, 2018, 104 pages.
Final Office Action received for U.S. Appl. No. 15/471,659 dated Jun. 11, 2019, 17 pages.
Non-Final Office Action received for U.S. Appl. No. 15/471,659 dated Aug. 8, 2019, 16 pages.

* cited by examiner

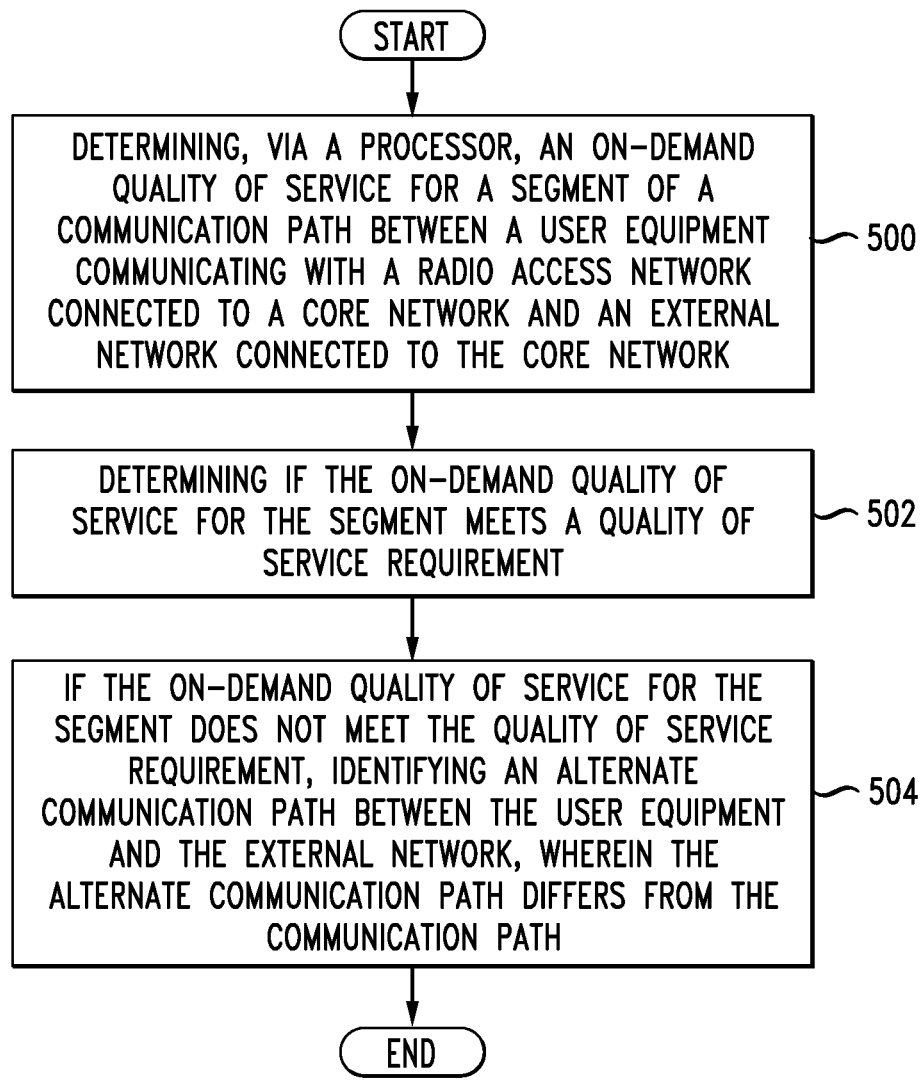

SYSTEM AND METHOD FOR QUALITY OF SERVICE IN A WIRELESS NETWORK ENVIRONMENT

PRIORITY INFORMATION

The present application is a continuation of U.S. patent application Ser. No. 15/471,659, filed Mar. 28, 2017, now U.S. Pat. No. 10,555,207, which is a continuation of U.S. patent application Ser. No. 14/457,187, filed Aug. 12, 2014, now U.S. Pat. No. 9,615,288, which is a continuation of U.S. patent application Ser. No. 13/555,915, filed Jul. 23, 2012, now U.S. Pat. No. 8,805,382, the entire contents of which applications are hereby incorporated herein by reference in their respective entireties.

BACKGROUND

1. Technical Field

The present disclosure relates to wireless communications and more specifically to on-demand quality of service guarantees in a wireless network environment.

2. Introduction

The increasing use of mobile applications has prompted a growing demand for mobile access to online content. Online applications, such as multimedia online gaming, content streaming, mobile TV, and Web 2.0, have quickly emerged to serve this growing demand for mobile data connectivity. However, online applications often face difficult challenges resulting from network and performance limitations. For example, the quality of the online experience provided by online applications depends largely on the quality of the network and availability of high-speed data. Yet the quality of the network and availability of high-speed data is often limited and difficult to control and predict, particularly as the application performance demands and diversity of the network increase. These challenges have catapulted efforts to improve current wireless access technologies to keep pace with the increasing network and data quality and performance demands of online applications.

One such effort is the 3GPP Long Term Evolution (LTE) standard for wireless communications. LTE provides a standard for wireless communications of high-speed data for mobile phones and data terminals, which brings substantial performance improvements and a significantly enhanced user experience with full mobility. LTE, through its radio access, the Evolved UMTS Terrestrial Radio Access Network (E-UTRAN), provides improved throughputs, higher capacity, and better overall performance. But while LTE brings significant benefits, it also faces significant hurdles in Quality of Service (QoS) control. Unlike traditional telecommunications networks, which implement traditional QoS approaches such as best-effort delivery, network resources reservation, or packet marking on data communication paths, LTE frequently utilizes different logical paths for signaling and data transfer. As a result, traditional QoS approaches are often inadequate in the LTE context.

LTE overcomes some of the inadequacies of traditional QoS approaches by implementing a policy entity which links the signaling and data transfer planes to allow QoS at the data transfer plane. Currently, the policy entity can enforce pre-defined QoS parameter values and change these values according to a local configuration or instructions from another policy entity. However, the policy entity is unable to adapt to meet a required on-demand QoS that cannot otherwise be met due to network resource constraints; this on-demand QoS is simply denied. Accordingly, LTE networks are limited in their capacity to meet a user application QoS, such as throughput, minimum delays, and minimum interruption in user data transfer, when a network resource, such as the radio access, has reached an upper capacity limit.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be implemented to provide quality of service guarantees in a wireless network environment. For example, these approaches can be implemented to provide on-demand quality of service in an LTE network. Moreover, these approaches can be implemented to ensure that a requested on-demand quality of service is not simply denied in an absence of network resources. When a capacity limit is reached in a wireless network environment, these approaches can be used to reroute traffic in order to meet an on-demand quality of service and avoid interruptions. This way, an individual subscriber's data and service needs are not denied during or after a call setup, and delays and interruptions in user data transfer are reduced to a minimum. In addition, an individual subscriber can experience an improved performance from an increase in available bandwidth and a maximum data rate per cell.

Disclosed are systems, methods, and non-transitory computer-readable storage media for providing on-demand QoS control in a wireless network environment. First, the system determines an on-demand quality of service for a segment of a communication path between a user equipment communicating with a radio access network connected to a core network and an external network connected to the core network. The system can determine the on-demand quality of service for the segment by monitoring network interfaces and calculating quality of service related measurements for the segment. In one embodiment, the system determines the on-demand quality of service by monitoring and evaluating performance management and fault management data. The segment can be a portion of the communication path or the entire communication path. For example, the on-demand quality of service for a segment of a communication path can be an on-demand quality of service for a portion of the communication path, or can be an end-to-end, on-demand quality of service for the communication path. The radio access network can be a UMTS terrestrial radio access network, an evolved UMTS terrestrial radio access network, a GSM radio access network, a GSM EDGE radio access network, etc. Moreover, the core network can be an evolved packet core network, a packet data network, a provider network, and so forth.

Next, the system determines if the on-demand quality of service for the segment meets a quality of service requirement. The quality of service requirement can be a quality of service requested from a policy entity, for example. In one embodiment, the quality of service requirement is an application quality of service need. The system can determine if the on-demand quality of service for the segment meets the quality of service requirement by comparing the quality of service requirement with quality of service related measurements associated with the on-demand quality of service for the segment and/or communication path. The quality of service related measurements can include, for example, a bandwidth, a signal power, a bit rate, a delay, a loss, a jitter, etc.

If the on-demand quality of service for the segment does not meet the quality of service requirement, the system identifies an alternate communication path between the user equipment and the external network, wherein the alternate communication path differs from the communication path. The system can then establish the alternate communication path for the communication session. In one embodiment, the system provides a list of alternate communication paths to a mobility management entity, and the mobility management entity sets up and coordinates an alternate communication path from the list of alternate communication paths.

The alternate communication path can be a different communication path that is capable of meeting the quality of service requirement. The alternate communication path can also be, for example, a best communication path from a list of communication paths. Moreover, the alternate communication path can include one or more networks and/or network devices from the communication path. For example, the alternate communication path can add/subtract one or more networks and/or network devices to the communication path.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 5 illustrates an example method embodiment.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for on-demand quality of service (QoS) in wireless network environments. A system, method and non-transitory computer-readable media are disclosed which detect on-demand QoS needs in a wireless network environment, such as a 3GPP Long Term Evolution (LTE) network, and takes appropriate action to meet the on-demand QoS needs, even in the absence of network resources. A brief introductory description of a basic general purpose system or computing device in FIG. 1, which can be employed to practice the concepts, is disclosed herein. A more detailed description of on-demand QoS in a wireless network environment will then follow. Several variations shall be discussed herein as the various embodiments are set forth. The disclosure now turns to FIG. 1.

Figure 1:
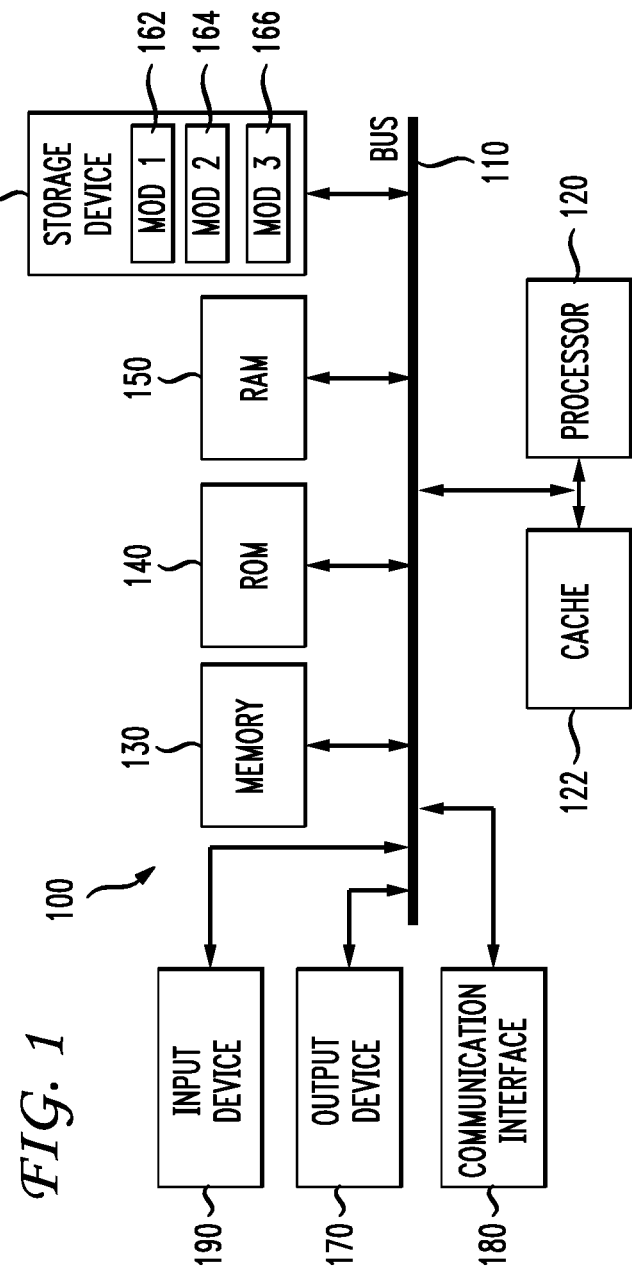
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, a solid-state drive, a tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide non-volatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
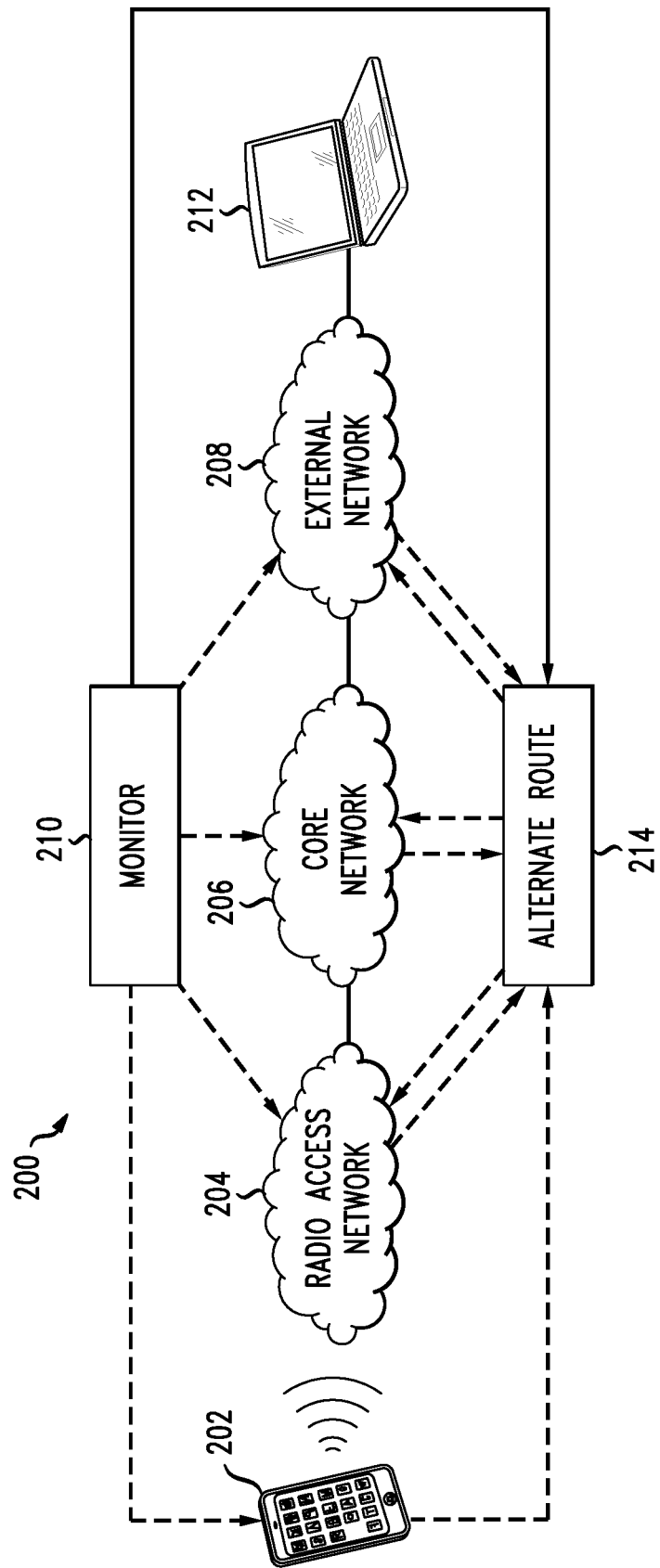
FIG. 2 illustrates an exemplary network architecture for on-demand quality of service.

Having disclosed some components of a computing system, the disclosure now turns to FIG. 2, which illustrates an exemplary network architecture 200 for on-demand Quality of Service. The phone 202 and the computer 212 can communicate via the network architecture 200. The network architecture 200 includes a radio access network 204, a core network 206, and an external network 208. The radio access network 204 serves as an air interface, residing between the phone 202 and the core network 206, and providing a communication link to the core network 206. For example, the radio access network 204 can provide a radio-based communication link between the core network 206 and wireless devices, such as phones, computers, portable media devices, gaming systems, GPS devices, network televisions, Femtocells, conferencing systems, base stations, wireless terminals, mobile stations, etc. The radio access network 204 can include various telecommunication devices, systems, and/or networks. Non-limiting examples of such devices, systems, and networks include Femto-cell technology, Wi-Fi, Global System for Mobile Communications (GSM) systems, GSM Radio Access Networks (GRANs), GSM EDGE Radio Access Networks (GERANs), Universal Terrestrial Radio Access Networks (UTRANs), Evolved Universal Terrestrial Radio Access Networks (E-UTRANs), Worldwide Interoperability for Microwave Access (WiMAX) systems, and so forth. Moreover, the radio access network 204 can carry many types of traffic and signaling, such as circuit switched (e.g., voice and data) and packet-switched (e.g., internet protocol (IP), asynchronous transfer mode (ATM), and/or frame relay) traffic and signaling.

The core network 206 can be, for example, a provider network, an enterprise backbone, a packet data network, an evolved packet core network, etc. The core network 206 communicates with the phone 206 via the radio access network 204. The core network 206 can also communicate with other wireless devices via the radio access network 204 or any other radio access device. If a wireless device has dual-mode capabilities, the core network 2006 can connect to the wireless device via multiple radio access networks which are simultaneously connected to the wireless device. Further, the core network 206 connects the phone 202 with an external network 208. In particular, the core network 206 communicates with the external network 208 via a router, such as a packet data network gateway, to provide a link between the phone 206 and the external network 208.

The external network 208 can be, for example, a mobile services network, an operator services network, an internet service provider, a public switched telephone network, a packet-switched network, a circuit-switched network, an IP Multimedia Subsystem (IMS) network, an LTE network, an LTE advanced network, a cellular network, a wireless network, and so forth. Moreover, the external network 208 can include a public network, such as the Internet, and/or a private network, such as a local area network (LAN), a home network, a virtual private network (VPN), an intranet, an enterprise network, and virtually any other form of network. The external network 208 can provide multiple services to the phone 202, such as voice, data, Internet, multimedia, broadband, messaging, push to talk, conferencing, gaming, web, voice over IP (VoIP), and streaming services, for example. Also, the external network 208 can connect one or more devices to the phone 202 via the core network 206.

In FIG. 2, the computer 212 can communicate with the phone 202 via the communication path 204, 206, 208. The monitor 210 can monitor the communication along the communication path 204, 206, 208 to detect on-demand QoS needs and coordinate an alternate route 214 when necessary to meet a QoS requirement. If, during a communication session, the monitor 210 detects a problem at the radio access network 204, the core network 206, and/or the external network 208, the monitor 210 can coordinate an alternate route 214 to allow the communication between the phone 202 and the computer 212 to continue within the QoS requirements. For example, if the monitor 210 detects that the radio access network 204 has reached a capacity limit, the monitor 210 can coordinate an alternate route 214 for the communication between the phone 202 and the core network 206, the external network 208, or the computer 212. In one embodiment, the monitor 210 monitors the communication along the communication path 204, 206, 208 to detect on-demand QoS needs and provides a list of alternate paths to a policy entity when the communication path 204, 206, 208 is unable to meet a QoS requirement. The QoS requirement can be a pre-defined QoS parameter associated with an application, such as a presence services, messaging, push to talk over cellular, voice, video, conferencing services, IP multimedia services, VoIP, and online gaming application. The QoS requirement can also be a QoS request from an application or device. In one embodiment, the QoS requirement is a QoS request from a policy entity.

The alternate route 214 allows the communication between the phone 202 and the computer 212 to be rerouted in order to continue communicating within the QoS requirement(s). For example, if the radio access network 204 has no available capacity, the alternate route can avoid the radio access network 204 by routing traffic through a different device and/or network. The alternate route 214 can include virtually any network and network device, such as a femtocell, a GPS receiver, a Wi-Fi network, a home network, a base station, an antenna, a modem, a WIMAX network, a different radio access network, a wireless terminal, an IMS network, and so forth. The alternate route 214 can also include a portion of the communication path 204, 206, 208. For example, the alternate route can include a wireless local area network, the core network 206, and the external network 208.

The monitor 210 can be any network device configured to monitor a communication between the radio access network 204, the core network 206 and the external network 208. The monitor 210 can include storage and evaluating capabilities, to collect, process, and analyze QoS related measurements. For example, the monitor 210 can be a network server, a software agent, a wireless terminal, a router, a service level agreement (SLA) monitor, a surveillance server, a computer, a monitoring system, or any device configured to calculate QoS measurements. The monitor 210 can reside in the core network 206, the external network 208, or a separate network, which can include one or more networks. In one embodiment, the monitor 210 is a surveillance server configured to monitor performance management (PM) data and fault management (FM) data. A system and method for monitoring some selected PM data is further explained in U.S. patent application Ser. No. 12/712,424, filed on Feb. 25, 2010, titled "Timed Fingerprint Locating In Wireless Networks," the contents of which are incorporated by reference herein in their entirety.

The monitor 210 can monitor the interfaces on the radio access network 204, the core network 206, and the external network 208, and calculate QoS related measurements, such as bandwidth, delay, loss, signal power, bit rate, jitter, congestion, error rates, etc. The monitor 210 can then analyze the QoS related measurements to determine if a requested QoS for an application, such as LTE VoIP, can be met. If the monitor 210 determines that the requested QoS cannot be met, the monitor 210 can identify the alternate route 214 as an alternative communication path. The monitor 210 can also select the alternate route 214 from a list of alternate routes, or provide the list of alternate routes to a remote device, so the remote device can select the alternate route 214. The monitor 210 and/or the other device can then coordinate the alternate route 214 as an alternative communication path. The alternate route 214 can be a best alternate route from a list of alternate routes, for example. The alternate route 214 can also be selected/identified based on various factors, such as bandwidth, capacity, QoS, a status, a parameter, a history, a cost, a schedule, a time, a service, a topology, a performance requirement, an application, a location, a distance, a duration, a configuration, a reliability, an agreement, an analysis, a statistic, and so forth.

The principles set forth herein can be applied to various telecommunication devices, systems, and/or networks. Non-limiting examples of such devices, systems, and networks include WiMAX, WiFi, Femtocell technology, LTE, LTE Advanced, General Packet Radio Service (GPRS), Enhanced GPRS, Universal Mobile Telecommunications System (UMTS), GSM, GRAN, GERAN, UTRAN, E-UTRAN, IMS, 3GPP2 Ultra Mobile Broadband (UMB), High Speed packet Access (HSPA), High Speed Downlink Packet Access (HSDPA), High Speed Uplink Packet Access (HSUPA), Wideband Code Division Multiple Access (W-CDMA), Enhanced Data rates for GSM Evolution (EDGE), etc. The principles set forth herein can also be applied to legacy telecommunication technologies.

Figure 3:
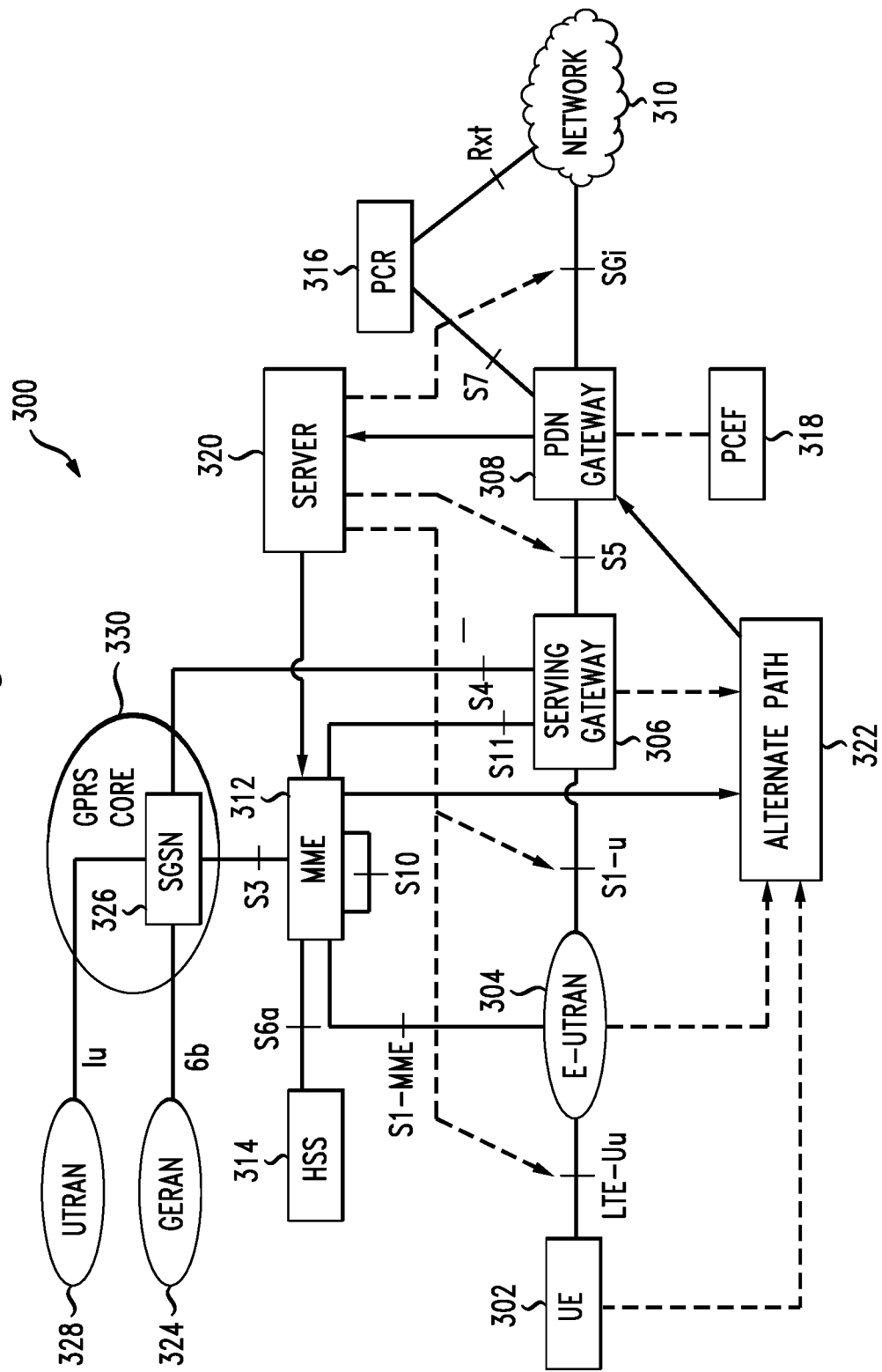
FIG. 3 illustrates an exemplary 3GPP long term evolution architecture for on-demand quality of service.

FIG. 3 illustrates an exemplary long term evolution architecture 300 for on-demand quality of service. Here, the user equipment 302 communicates with the E-UTRAN 304 via the LTE-Uu interface, which is the air interface between the user equipment 302 and E-UTRAN 304. The user equipment 302 can be any wireless device, such as a mobile phone, a computer, an online gaming system, a conferencing system, a multimedia player, a base station, a handset, an access terminal, a subscriber station, a wireless terminal, or any device used to receive and/or transmit data, packets, frames, signals, text, voice, video, audio, image, and any other data or signaling stream. The E-UTRAN 304 interfaces with the serving gateway 306 via the S1-$u$ interface, and the mobility management entity (MME) 312 via the S1-MME interface.

The serving gateway 306 routes and forwards user data packets, and relays traffic between the PDN gateway 308 and GPRS core networks, serving as a mobility anchor between the LTE network and the GPRS core networks. In FIG. 3, the serving gateway 308 relays traffic between the GPRS core network 330 and the PDN gateway 308. Here, the serving gateway 308 communicates with the serving GPRS support node (SGSN) 326 via the S4 interface, and the SGSN 326 communicates with the GERAN 324 and the UTRAN 328 via the Gb and Iu interfaces, respectively. The serving gateway 306 is also responsible for handovers with neighboring elements in the E-UTRAN 304, such as evolved node b elements, for example. The serving gateway 306 can monitor and maintain context information related to the user equipment 302 during idle state, and generate paging requests when data for the user equipment 302 arrives from the network (i.e., on downlink). Moreover, the serving gateway 306 can replicate user traffic in case of lawful interception.

The MME 312 is the control node for the E-UTRAN 304. The MME 312 manages and stores user equipment 302 context, such as user identity, mobility state, security parameters, and generates temporary identities for the user equipment 302. The MME 312 is responsible for choosing the serving gateway 306 for the user equipment 302. The MME 312 communicates with the serving gateway 306 via the S11 interface. The MME 312 can also communicate with other MMEs via the S10 interface. The MME 312 is also responsible for authenticating the user on the user equipment 302. The MME 312 authenticates the user by interacting with the home subscriber server (HSS) 314 via the S6a interface. The HSS 314 is a central database that contains information relating to the user and subscription. Moreover, the MME 312 interfaces with the SGSN 326 in the GPRS core network 330 via the S3 interface. The S3 interface allows for user and bearer information exchange for access network mobility in idle and/or active state.

The PDN gateway 308 interfaces with the external network 310 via the SGi interface. Accordingly, the PDN gateway 308 connects the user equipment 302 to the external network 310. The external network 310 can be a service provider, a public switched telephone network, a packet data network, a circuit-switched network, an IMS network, an internet backbone, an operator services network, a packet-switched network, a core network, an LTE network, an LTE advanced network, a mobile network, a cellular network, a GPRS network, and so forth. Moreover, the external network 310 can include a public network, such as the Internet, and/or a private network, such as a local area network, an intranet, an extranet, a virtual private network, a home network, a corporate network, etc. Further, the external network 310 can provide various types of online services, such as mobile broadband, text, audio, video, voice, multimedia content, VoIP, IP television, messaging, Internet, IMS, conferencing, push to talk, streaming, online gaming, data, and so forth.

The PDN gateway 308 can connect the user equipment 302 to external networks by being the point of exit and entry of traffic destined to the user equipment 302. Thus, the PDN gateway 308 can provide the user equipment 302 access to various telecommunication technologies and operator IP services, such as IMS, Internet, mobile broadband, multimedia content, application servers, core services, messaging, conferencing, voice, video, data, VoIP, LTE VoIP, packet switched stream, and so forth. In one embodiment, the PDN gateway 308 connects the user equipment 302 with multiple external networks. In another embodiment, the user equipment 302 can have simultaneous connectivity with multiple PDN gateways for accessing multiple external networks. The PDN gateway 308 can also perform policy enforcement, packet filtering for users, charging support, lawful interception, packet screening, etc.

The PDN gateway 308 communicates with a policy and charging rules function (PCRF) 316 and a policy and charging enforcement function (PCEF) 318 to determine and enforce policy rules for subscribers on the network. The PCRF 316 can be a policy server or a policy decision function, for example. The PCRF 316 can be a centralized device acting as a policy decision point for the wireless operator. The PCRF 316 can also be a software component configured to access subscriber databases and charging systems to determine policy rules and make policy decisions. The PCEF 318 can be a centralized device or a software component on the PDN gateway 308. The PDN gateway 308, PCRF 316, and PCEF 318 can also be placed on the same device or chassis. The PCEF 318 can enforce QoS parameter values assigned by the MME 312 based on the subscription information retrieved from the HSS 314, and can change these values in interaction with the PCRF 316 and/or according to a local configuration. In FIG. 3, the PCEF 318 is a software component that resides in the PDN gateway 308, and the PCRF 316 is a software component that resides in a centralized device which communicates with the PDN gateway 308 via the S7 interface, and the external network 310 via the Rx interface.

The server 320 monitors the communication path between the user equipment 302 and the external network 310 to obtain QoS related information, such as bandwidth, delay, loss, bit rate, jitter, signal power, error rate, congestion, etc. For example, the server 320 can monitor FM and/or PM data in the communication path to calculate QoS measurements. Here, the server 320 can be, for example, a surveillance server with PM and FM monitoring and evaluating capabilities. The server 320 can be any device configured to monitor the communication path, such as a server, a router, a software agent, a computer, a phone, etc. The server 320 can also be configured to collect, process, and analyze QoS data. In one aspect, the server 320 is a monitoring device with networking capabilities, configured to monitor the communication path and transmit data statistics to another device for analysis. In another aspect, the sever 320 is a service level agreement (SLA) monitor.

The server 320 can use the QoS related information to determine if a required QoS for an application can be met. For example, the server 320 can monitor the LTE-Uu, S1-u, S5, and/or SGi interfaces, calculate QoS related measurements (e.g., bandwidth, delay, loss), and decide if a QoS requirement for an application, such as LTE VoIP, requested from the PCEF 318 and/or pre-defined as a QoS parameter, can be met. If based on the QoS related measurements, the server 320 determines that the QoS requirement cannot be met, the server 320 can identify an alternate path 322. The server 320 can also provide a list of alternate paths to the MME 312. The alternate paths can include different communication paths which can be used to connect the user equipment 302 and the external network 310. A communication path can include, for example, networks and/or networking devices used to establish a communication between the user equipment 302 and the external network 310. After receiving the list of alternate paths, the MME 312 can coordinate the alternate path 322 to connect the user equipment 302 to the external network 310. For example, if the server 320 determines that the E-UTRAN 304 and the S5 bearer have reached an upper capacity limit, the MME 312 can ensure that a QoS requirement requested from the PCEF 318 is met by coordinating a best alternate bearer (route) to transfer user packets coming from external IP services, such as IMS, to the PDN gateway 308, and from the PDN gateway 308 to the user equipment 302. This way, the MME 312 can ensure that an end-to-end QoS is met.

As illustrated in FIG. 3, the MME 312 can coordinate an alternate bearer path from the PDN gateway 308 to the serving gateway 306, the E-UTRAN 304, or the user equipment 302. For example, if the server 320 determines that a QoS requirement for an application cannot be met because of a problem with the E-UTRAN 304, the MME 312 can setup the alternate path 322 to the user equipment 302 using a Femtocell, instead of the E-UTRAN 304, in order to meet the QoS requirement for the application. Here, the user equipment 302 can connect with the serving gateway 306 via the Femtocell, and the serving gateway 306 can forward traffic to the external network 310 via the PDN gateway 308. Thus, in this example, the alternate path 322 between the user equipment 302 and the external network 310 can include the Femtocell, the serving gateway 306, and the PDN gateway 308.

The server 320 can also be configured to identify the location of the user equipment 302 and determine if the user equipment 302 is within an allowed Femtocell area. In this case, the server 320 can notify the MME 312 when it detects that the user equipment 302 is within an allowed Femtocell area, so the MME 312 can decide how to setup the alternate path 322 to the user equipment 302. This can be done during and/or after the attach procedure (i.e., when the user equipment 302 attaches to the network). As another example, if the server 320 determines that the E-UTRAN is unable to meet a QoS requirement requested from the PCEF 318, the MME 312 can ensure that the QoS requirement is met by coordinating the alternate path 322 to transfer packets from the serving gateway 306 to the UTRAN 328, and from the UTRAN 328 to the user equipment 302.

Figure 4:
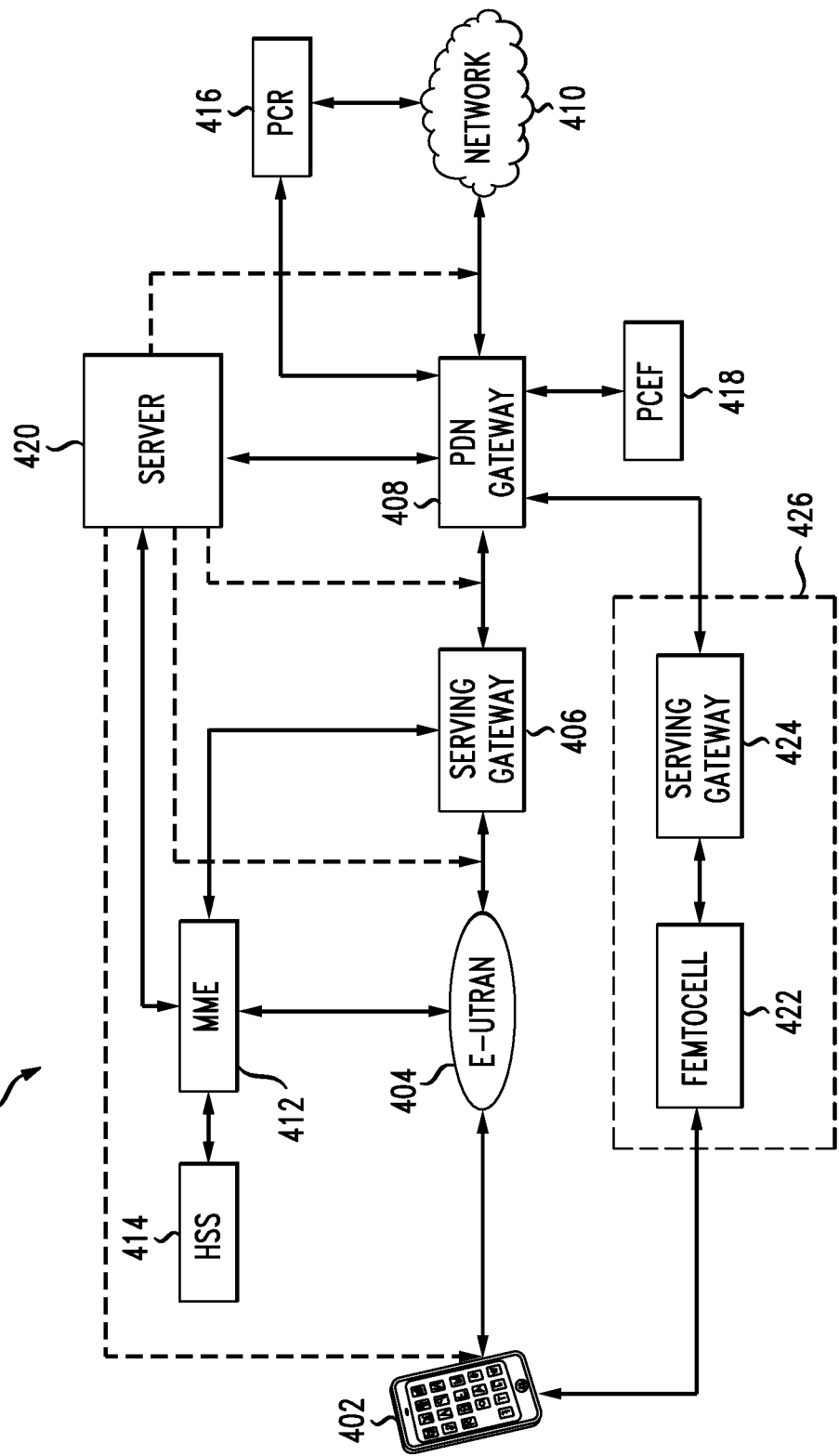
FIG. 4 illustrates an example of an alternate path for communication in an exemplary long term evolution architecture for on-demand quality of service.

FIG. 4 illustrates an example of an alternate path for communication in an exemplary long term evolution architecture 400 for on-demand quality of service. In this example, the long term evolution architecture 400 includes the E-UTRAN 404, the serving gateway 406, the PDN gateway 408, the MME 412, the HSS 414, the PCRF 416, the PCEF 418, and the server 420. The phone 402 communicates with the network 410 via the E-UTRAN 404, the serving gateway 406, and the PDN gateway 408. The server 420 monitors each segment of the communication path between the phone 402 and the network 410, which includes the segments between the phone 402 and the E-UTRAN 404, the E-UTRAN 404 and the serving gateway 406, the serving gateway 406 and the PDN gateway 408, and the PDN gateway 408 and the network 410, to calculate QoS measurements. The server 420 receives a QoS requirement for the communication session from the PCEF 418, and compares the QoS requirement with the QoS measurements to determine if the on-demand QoS requirements for the communication session can be met. In another embodiment, the server 420 compares pre-defined QoS parameters associated with an application with the QoS measurements to determine if the on-demand QoS requirements for the communication session can be met.

If the on-demand QoS requirements cannot be met, the server 420 provides an alternate path 426 to the MME 412, which the MME 412 can setup to ensure the on-demand QoS requirements are met. Alternatively, the server 420 can provide a list of alternate paths to the MME 412, which the MME 412 can use to select the alternate path 426. The MME 412 can select the alternate path 426 based on a parameter, a topology, a context, a history, a threshold, a status, a quality of service, a performance, an analysis, a best candidate, an availability of resources, a schedule, a cost, a policy, congestion feedback, traffic conditions, and/or any other criteria. In FIG. 4, the alternate path 426 includes a Femtocell 422 and a serving gateway 424. Here, the phone 402 communicates with the Femtocell 422, which interfaces with the serving gateway 424. The serving gateway 424 then transfers the packets from the Femtocell 422 to the PDN gateway 408. Finally, the PDN gateway 408 can link the phone 402 to the network 410. The alternate path 426 can reduce delays and interruptions in user data transfer and ensure that an end-to-end quality of service is met throughout the communication session. If the long term evolution architecture 400 experiences an absence of network resources, a capacity limit, an error, etc., the MME 412 can setup the alternate path 426 to avoid interruptions of service and connectivity and/or performance reductions.

Other exemplary devices which could be connected in the long term evolution architecture 400 are tablet computers, hand held music or audio players having networking capabilities, vehicles equipped with mobile network access, network televisions, conferencing systems, online game systems, GPS devices, portable computing devices, wireless terminals, desktop computers, laptop computers, personal wireless devices, etc. Such devices can include capabilities for producing media communications, including audio, video, text, and any other communication format, and can contain media engines which format and manipulate raw data into packets for communication. In many media engines, the data requires modulation and manipulation to correctly format the data into packets; in other media engines, the data needs only to be formatted and inserted into packet configurations.

While the alternate path 426 in FIG. 4 is shown to include a Femtocell and a serving gateway, those of skill in the art will readily understand that the alternate path 426 can include other network components and technologies. For example, the alternate path 426 can include a home network, a UTRAN, a GERAN, a WiFi network, an SGSN, a WIMAX network, a UMTS network, a CDMA 2000 network, an LTE network, a base station, a modem, a router, a GPS receiver, a satellite, a Bluetooth device, and so forth. The Femtocell and serving gateway in the alternate path 426 are non-limiting examples provided for illustration purposes.

Having disclosed some basic system components and concepts, the disclosure now turns to the exemplary method embodiment shown in FIG. 5. For the sake of clarity, the method is discussed in terms of an exemplary system 100, as shown in FIG. 1, configured to practice the method. The steps outlined herein are exemplary and can be implemented in any combination thereof, including combinations that exclude, add, or modify certain steps.

The system 100 first determines an on-demand quality of service for a segment of a communication path between a user equipment communicating with a radio access network connected to a core network and an external network connected to the core network (500). The segment can be a portion of the communication path or the entire communication path. The user equipment can be any wireless device, such as a mobile phone, a computer, a portable media device, an online gaming system, a GPS device, a network television, a Femtocell, a conferencing system, a wireless terminal, a mobile station, a network card, a modem, a personal wireless device, a handheld device, and so forth. The radio access network can include one or more GSM networks, GRANs, GERANs, UTRANs, E-UTRANs, WIMAX networks, WiFi networks, Femtocells, GPRS networks, and so forth. Also, the radio access network can carry many types of traffic, such as circuit-switched and packet-switched traffic, for example. The core network can be, for example, a system architecture evolution network, an evolved packet core network, a GPRS core network, an LTE core network, an LTE advanced network, a provider network, a packet data network, a cellular network, etc. The external network can include a public network, such as the Internet, and/or a private network, such as a LAN, a home network, a VPN, a virtual local area network, an intranet, an enterprise network, and virtually any other form of network. The external network can be, for example, an internet service provider network, a packet-switched network, a circuit-switched network, a public switched telephone network, an IMS network, a packet data network, an LTE network, an LTE advanced network, a core network, a GPRS network, a WiFi network, a GSM network, a WIMAX network, etc.

The system 100 can determine the on-demand quality of service by monitoring the segment of the communication path and calculating quality of service related measurements for the segment, such as bandwidth, delay, loss, bit rate, jitter, error rate, signal power, signal-to-noise-ratio, congestion, and so forth. In one embodiment, the system 100 determines the on-demand quality of service for every segment of a communication path between the user equipment communicating with the radio access network connected to a core network and the external network connected to the core network. In another embodiment, the system 100 monitors PM and FM data in the segment and calculates quality of service related measurements for the segment. In yet another embodiment, the system 100 monitors PM and FM data in the communication path and calculates an end-to-end quality of service.

Then, the system 100 determines if the on-demand quality of service for the segment meets a quality of service requirement (502). The system 100 can make the determination by analyzing the on-demand quality of service calculated for the segment/communication path and the quality of service requirement. For example, the system 100 can make the determination by comparing the on-demand quality of service calculated for the segment (and/or the communication path) with the quality of service requirement. Also, the system 100 can use quality of service related measurements to determine if the on-demand quality of service meets the quality of service requirement. In some cases, the system 100 can make the determination based only on the on-demand quality of service calculated. For example, the system 100 can assume that the quality of service requirement cannot be met if the system 100 detects that a segment or device in the communication path has reached an upper capacity limit, if a segment or device in the communication path is unresponsive, if the end-to-end communication path experiences an interruption, if the on-demand quality of service falls below a threshold, etc.

In one embodiment, the system 100 detects an on-demand application quality of service need, and determines if the communication path can meet the on-demand application quality of service need by evaluating PM and FM data collected by monitoring the communication path. In another embodiment, the system 100 detects an end-to-end application quality of service requirement, and decides if the communication path can meet the end-to-end application quality of service based on end-to-end traffic statistics. In yet another embodiment, the system 100 receives a quality of service request from a policy entity and analyzes PM and FM data in the communication path to determine if the quality of service can be satisfied by the current communication path.

The quality of service requirement can be, for example, a committed quality of service, a requested quality of service, a configured quality of service, a requisite quality of service, a quality of service need, a pre-defined quality of service parameter, a throughput requirement, a minimum delay, a minimum interruption in user data transfer, and so forth. For example, the quality of service requirement can be a quality of service requested from a remote device. Also, the quality of service requirement can be based on a policy, a status, a subscription, a flag, a profile, a threshold, a capacity, a local configuration, a performance requirement, a schedule, an agreement, a parameter, an application, a location, a service, a history, a probability, a rule, a user, a time, a topology, available resources, etc. In one embodiment, the quality of service requirement is a quality of service requested from a policy and charging enforcement function. In another embodiment, the quality of service requirement is a quality of service setting configured on the system 100. In yet another embodiment, the quality of service requirement is a quality of service request from an application.

Next, if the on-demand quality of service for the segment does not meet the quality of service requirement, the system 100 identifies an alternate communication path between the user equipment and the external network, wherein the alternate communication path differs from the communication path. The system 100 can then establish the alternate communication path so traffic is routed through the alternate communication path. Alternatively, the system 100 can provide the alternate communication path to another device for coordinating the alternate communication path. For example, the system 100 can provide the alternate communication path to an MME, and the MME can then setup the alternate communication path so traffic is routed through the alternate communication path. The system 100 can also provide a list of alternate communication paths to an entity which selects the alternate communication path from the list and coordinates the alternate communication path.

The alternate communication path can be identified based on a cost, a history, a topology, a capacity, an application, a service, a schedule, a time, a location, a user, a profile, a subscriber, an agreement, a policy, a distance, a standard, a protocol, a configuration, a parameter, a probability, a rule, a request, a duration, a threshold, a bandwidth, available resources, statistics, the quality of service requirement, the current communication path, the user equipment, the external network, etc. For example, the alternate communication path can be a different communication path selected based on a capacity to meet the quality of service requirement. Also, the alternate communication path can be, for example, a best communication path from a list of communication paths.

Furthermore, the alternate communication path can include one or more networks, systems, devices, and/or wireless technologies in the communication path. For example, if the communication path between the user equipment and the external network includes an E-UTRAN, a serving gateway, and a packet data network gateway, the alternate communication path can replace one or more of these components for one or more different components. Alternatively, the alternate communication path can include all of the components in the communication path between the user equipment and the external network, but also add one or more new components to the communication path. Here, a component can be added adjacent to one or more components in the communication path. To illustrate, the alternate communication path in one example can include the E-UTRAN, the serving gateway, and the packet data network gateway in the communication path shown above, and also a GERAN added to connect the user equipment to the E-UTRAN. As another example, the alternate communication path can replace the E-UTRAN with a Femtocell which connects the user equipment to the packet data network gateway in the communication path.

In one embodiment, the system 100 determines that an on-demand quality of service requirement cannot be met for an end-to-end communication path due to an interruption between the user equipment and an E-UTRAN. Here, the communication path between the user equipment and the external network includes the E-UTRAN, a serving gateway, and a packet data network gateway. The system 100 identifies an alternate communication path capable of meeting the on-demand quality of service, which reroutes traffic between the user equipment and the E-UTRAN through a WiFi network with a 4G interface. The user equipment can connect to the WiFi network via a wireless network interface card, and the WiFi network can connect the user equipment to the E-UTRAN via the 4G interface. The E-UTRAN can connect to the serving gateway, which forwards traffic to the packet data network gateway. The packet data network gateway can then link the user equipment to the external network. The user equipment can thus continue to receive the operator's IP services without interruption and without violating the quality of service requirement. In another embodiment, the alternate communication path identified by the system 100 is a roaming architecture with home routed traffic. Here, rather than connecting to the home operator's E-UTRAN and serving gateway, the user equipment connects to a visited operator's E-UTRAN and serving gateway. The visited operator's serving gateway then forwards traffic to the home operator's packet data network gateway, which connects the user equipment to the home operator's IP services.

The principles set forth herein can be applied to various telecommunication devices, systems, and/or networks. Non-limiting examples of such devices, systems, and networks include WiMAX, WiFi, Femtocell technology, LTE, LTE Advanced, GPRS, Enhanced GPRS, UMTS, GSM, GRAN, GERAN, UTRAN, E-UTRAN, IMS, 3GPP2 UMB, HSPA, HSDPA, HSUPA, W-CDMA, EDGE, PSTN, etc. The principles set forth herein can also be applied to legacy telecommunication technologies.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method, comprising:
   determining, by network equipment comprising a processor, a parameter associated with a communication path between a user equipment communicating via a first network node of a first radio access network to a destination equipment; and
   based on the parameter, changing, by the network equipment, the communication path to a new communication path between the user equipment and the destination equipment, the new communication path comprising a second network node of a second radio access network, wherein the first network node and the second network node each are in direct communication with the user equipment in the communication path with no other network nodes between the user equipment and the first network node or the second network node.

2. The method of claim 1, wherein the parameter is associated with an on-demand quality of service determined for all or part of the communication path.

3. The method of claim 1, wherein the changing to the new communication path is based on the parameter meeting a quality of service requirement.

4. The method of claim 1, wherein the first radio access network is an evolved universal mobile telecommunications system terrestrial radio access network.

5. The method of claim 4, wherein the new communication path comprises one of the Internet, a local area network, a wide area network, and a virtual network.

6. The method of claim 1, wherein the new communication path utilizes a wireless local area network.

7. The method of claim 1, wherein the new communication path is between the user equipment and external network equipment of an external network that is external to a network comprising the network equipment.

8. The method of claim 1, wherein the parameter is associated with at least one from a group of parameters comprising a bandwidth parameter, a delay parameter, a signal power parameter, a packet loss parameter, an amount of jitter parameter, and a bit rate parameter.

9. The method of claim 1, wherein the parameter is associated with pre-defined quality of service parameters for an application.

10. The method of claim 1, wherein the determining of the parameter comprises detecting an on-demand application quality of service need associated with the user equipment.

11. A system, comprising:
a processor; and
a non-transitory computer-readable storage medium having instructions stored which, when executed by the processor, cause the processor to perform operations comprising:
determining a parameter associated with a communication path between a user equipment communicating via a first network node of a first radio access network to a destination equipment; and
based on the parameter, changing the communication path to a new communication path between the user equipment and the destination equipment, the new communication path comprising a second network node of a second radio access network, wherein the first network node and the second network node each are in direct communication with the user equipment in the communication path with no other network nodes between the user equipment and the first network node or the second network node.

12. The system of claim 11, wherein the parameter is associated with an on-demand quality of service determined for all or part of the communication path.

13. The system of claim 11, wherein the changing to the new communication path is based on the parameter meeting a quality of service requirement.

14. The system of claim 11, wherein the first radio access network is an evolved universal mobile telecommunications system terrestrial radio access network.

15. The system of claim 14, wherein the new communication path comprises at least one from a group of networks, comprising the Internet, a local area network, a wide area network, and a virtual network.

16. The system of claim 11, wherein the new communication path utilizes a wireless local area network.

17. The system of claim 11, wherein the new communication path is between the user equipment and an external network.

18. The system of claim 11, wherein the parameter is associated with one or more of a bandwidth, a delay, a signal power, a packet loss, an amount of jitter, and a bit rate.

19. The system of claim 11, wherein the parameter is associated with pre-defined quality of service parameters for an application.

20. A non-transitory machine-readable medium having instructions stored which, when executed, facilitate performance of operations, comprising:
determining a parameter associated with a communication path between a user equipment communicating through a first wireless network node of a first radio access network to a destination equipment; and
based on the parameter, changing the communication path to a new communication path between the user equipment and the destination equipment, wherein the new communication path comprises a second wireless network node of a second radio access network, wherein the first wireless network node and the second wireless network node each are in direct communication with the user equipment in the communication path with no other network nodes between the user equipment and the first wireless network node or the second wireless network node.

* * * * *